J. A. KELLY.

PROCESS OF MAKING SHOES.

APPLICATION FILED OCT. 16, 1916.

Reissued Feb. 20, 1917.

14,261.

INVENTOR-

John A Kelly

UNITED STATES PATENT OFFICE.

JOHN A. KELLY, OF BRAINTREE, MASSACHUSETTS, ASSIGNOR, BY DIRECT AND MESNE ASSIGNMENTS, TO UNITED SHOE MACHINERY COMPANY, OF PATERSON, NEW JERSEY, A CORPORATION OF NEW JERSEY.

PROCESS OF MAKING SHOES.

14,261. Specification of Reissued Letters Patent. Reissued Feb. 20, 1917.

Original No. 1,128,608, dated February 16, 1915, Serial No. 847,179, filed June 25, 1914. Application for reissue filed October 16, 1916. Serial No. 126,046.

*To all whom it may concern:*

Be it known that I, JOHN A. KELLY, a citizen of the United States, residing at Braintree, in the county of Norfolk and State of Massachusetts, have invented new and useful Improvements in Processes of Making Shoes, of which the following is a specification.

This invention is a process of making shoes, and it involves, more particularly, an improvement in lasting the upper whereby the procedure is simplified by the combination of certain steps and thereby rendering practical the omission of certain other steps heretofore considered essential, thus saving time and labor and securing economy in the manufacture of the resulting articles.

The procedure heretofore in vogue involves the following steps:—From the pulling-over machine the lasted shoe is passed over to workmen known as "side lasters" who take the shoe in hand and by aid of pincers pull the side portions of the upper over the last to an extent determined by the final stretching of the upper at the respective side portions, said workmen driving the lasting tacks through the upper into the last; then the lasted shoe is carried to an end lasting machine embodying wipers by the operation of which the toe and heel of the upper are lasted in; then the shoe is placed on a rack to remain over night in order to dry the upper and thereby cause it to acquire the shape of the last to a sufficient extent to allow the lasting tacks to be pulled out after an upper stapling operation hereinafter mentioned; then the shoe is operated upon by a stapling machine embodying as elements thereof a throat plate and a movable anvil, the latter operating in the channel of the insole so as to press the shoe against the throat plate whereby the upper and insole are united by wire staples, as set forth in United States Letters Patent No. 1,023,555, granted April 16, 1912 on application of W. J. Drey. After the upper stapling operation the lasting tacks are pulled and then the welt is sewed to the shoe and the latter is finished in the usual manner.

After assemblage of the several parts and the operation thereon of the pulling-over machine, the shoe when made in accordance with my process is subjected directly to the following operation:—The respective side portions of the upper are lasted and stapled by a relative movement between the anvil and the throat plate of a novel machine forming the subject-matter of United States Letters Patent No. 1,128,609, granted Feb. 16, 1915 on my application, said side lasting being performed by pulling or forcing the side edge of the upper over the last at two points located respectively at the two lateral sides of an anvil and throat plate of the machine, and simultaneously with the side pull at the two points a wire staple is inserted to fasten the upper and insole at a point intermediate the separated points of pull, the foregoing operations being repeated along the two sides of the shoe until the two sides of the upper shall have been lasted and stapled.

By my improvement the labor of side lasting the upper as a separate operation, the driving of the lasting tacks, and the further labor of pulling out the lasting tacks subsequent to the stapling operation are dispensed with, and the time required for side lasting and stapling is but slightly increased over the time formerly required for stapling alone, thus simplifying the operations of lasting the shoe, saving time and labor, and securing economy in the manufacture of the shoe.

In order that others skilled in the art may understand the invention and be shown a convenient method of practising it, I have illustrated one form of mechanism by which the side lasting and stapling of the shoe may be carried out expeditiously, but it is to be understood that the novel invention to be protected by this patent does not reside in the particular machine herein illustrated, nor does the invention involve a machine of a particular type for the reason that the procedure may be carried out by hand or by an equivalent machine suitable for the purpose.

Figure 1:
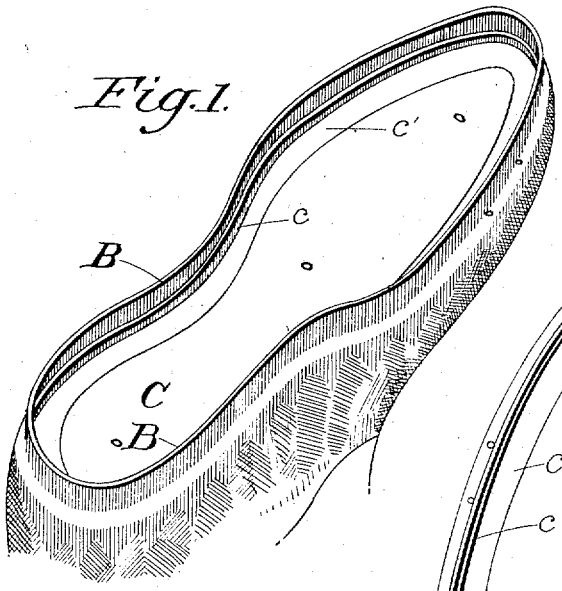
Figure 1 is a perspective view illustrating the insole and the upper applied to a last.
Figure 2:
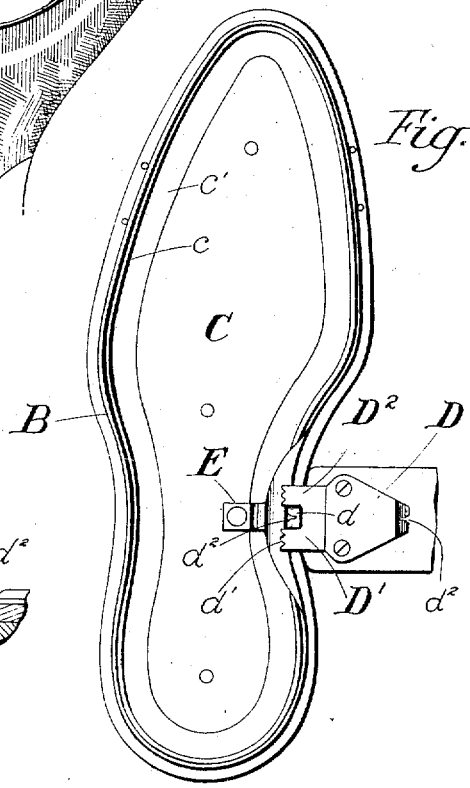
Fig. 2 is a plan view illustrating the method of performing the side lasting operation in accordance with this invention.
Figure 3:
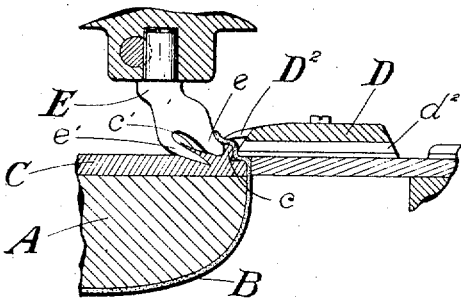
Fig. 3 is a vertical cross-section through a part of the last, the upper, and the insole, and illustrating the throat plate and the anvil coöperating therewith.

A designates a last, B the upper, and C an insole having two channels one of which produces a rib or shoulder *c* and the other a lip *c'*.

The mechanism herein shown for use in performing the side lasting and stapling operation simultaneously embodies a throat plate D, and an anvil E, the same being relatively movable one to the other and coöperating to insert the staple fastener and simultaneously therewith to side last the upper. The throat plate D is provided with a throat *d* and with members D' $D^2$, the latter being positioned on opposite sides of the throat *d* and projecting forwardly therefrom. Said members D' $D^2$ are integral with the throat plate, and as shown they are in the form of arms, the free edges of which are provided with teeth *d'*, the toothed edges of the members D' $D^2$ being in a plane above the throat *d*. As shown, the throat plate is adapted to be fixed in position, and it is provided with a channel $d^2$ in which operates the usual staple driver, the wire adapted to form the staple fastener being fed transversely to said channel, the machine being organized to operate like the commercial upper stapling machine built under the patent to Drey granted December 12, 1911, No. 1,011,592 and Patent No. 1,059,984, granted April 29, 1913, on application of Erickson and Cosgrove.

The anvil E is provided with a toe *e* on which is formed a staple clenching surface and with a lip *e'*, the latter depending from the body portion of the anvil and positioned in the rear of the toe. Said anvil E is operated substantially as disclosed in said patents by mechanism like that of the last-mentioned patent and it is adapted to travel in the inside channel of insole C, the toe *e* of the anvil coöperating with the rib *c* to locate the work properly with relation to the plane of insertion of the staple, whereas the lip *e'* engages the insole between the channel of the illustrated insole so as to bear against the lip *c'*, said rearwardly positioned lip *e'* of the anvil taking up some of the thrust exerted by the anvil upon the insole when pressing the last, the insole and the upper against the members D' $D^2$ of the throat plate. For practising this invention on shoes the insoles of which are formed with a single rib, the shape of the anvil will, of course, be suitably modified to adapt it for coöperating with the rib.

In carrying out my invention I proceed as follows: The parts to form the shoe are assembled in the usual way, that is to say, the insole C is tacked to the last A, the box toe and the counter are positioned within the toe and heel portions of the upper, and said upper is positioned over the last. The assembled shoe is now carried to the pulling-over machine, usual in the art, and it is subjected to the operation of said machine, so that the upper is pulled over the last at the sides and end of the toe portion thereof at one operation, said pulling-over machine operating to drive five tacks or temporary fastenings into the upper, one of said tacks being at the toe end of the last and the remaining four tacks being driven through the upper and into the insole, two on each side of the toe. Instead of passing the lasted shoe to the side lasters as heretofore, the shoe when made in accordance with my invention is carried from the pulling-over machine directly to the stapling machine embodying the throat plate D and anvil E. For side lasting and stapling, the last is placed below anvil E so that toe *e* and lip *e'* will engage the respective channel lips of the insole, and by the operation of the stapling machine the anvil is moved toward the throat plate, carrying the shoe with it and positioning the shoe relatively to the throat plate by reason of the engagement of the toe *e* and lip *e'*, and particularly the latter, with the insole that is tacked to the last bottom. During this movement of the shoe the free portion of the upper is engaged by the toothed members D' $D^2$ of the throat plate, whereas the insole is in engagement with the anvil, the movement of which presses the edge portion of the upper toward and into the throat *d* of the throat plate, while causing the toothed members D' $D^2$ to exert pressure upon said upper so as to pull the latter over the edge portion of the insole and the last, this pulling effect on the free edge of the upper taking place at opposite sides of the point of insertion of the staple, and said pulling operation being effected simultaneously with the insertion and clenching of the staple against lip *e* of the anvil, which follow automatically after the advance of the anvil as set forth in said Patent No. 1,059,984. The anvil is next backed away from the throat plate and the position of the shoe is shifted so as to present a fresh portion to the anvil and the throat plate, whereupon the operations are repeated until the side lasting of the upper is finished. After completing the side lasting of the upper on one side of the shoe, the other side of the shoe upper is lasted in accordance with the procedure of this invention.

From the foregoing description it will be understood that the novel procedure employed by me involves the side lasting of the upper by pulling-over the edge of said upper at two points located at the opposite sides of the point of insertion of the staple, and further that this pulling-over of the upper in the side lasting thereof takes place simultaneously with the stapling operation.

By my invention I am enabled to omit the hand operation of side lasting and save the manual labor performed by the workmen heretofore referred to as "side lasters," and, furthermore, the labor of driving the lasting tacks prior to stapling and of pulling out the lasting tacks subsequent to stapling the upper are wholly omitted, thereby simplifying the procedure and effecting substantial economy in the operation of lasting and making shoes.

Having thus fully described the invention, what I claim as new and desire to secure by Letters Patent is:

1. In the art of making shoes, the improvement which consists in providing an insole with an upstanding lip, and simultaneously side lasting the upper and stapling the upper to said upstanding lip of the insole by engaging the free edge of the upper upon its outer side above the insole by laterally separated pulling means and engaging the upper upon its inner side by means located between the pulling means and cooperating therewith to effect a firm pulling of the upper and its lining over the edge of the insole commencing before the insertion of the staple and continuing during the clenching of the staple.

2. The process herein described of making shoes which consists in providing an insole with an upstanding rib, attaching said insole to a last, drawing the upper around the last, and stapling the edge portion of the upper to the upstanding rib of the insole and simultaneously therewith side lasting the upper by drawing it at a point located at one lateral side of the point for insertion of the staple fastener by frictionally engaging the free edge of the upper upon its outer side above the insole only and pulling it inwardly over the rib of the insole while inserting the staple through the upper and rib in a plane between the pulling means and the underlying face of the insole.

3. The process herein described of making shoes which consists in providing an insole with an upstanding rib, attaching said insole to a last, pulling-over an upper relative to the last, and directly thereafter stapling the upper to the upstanding rib of the insole and simultaneously with said stapling operation side lasting the upper by pulling it inwardly over the top of the rib of the insole at points positioned on opposite sides of the point of insertion of the staple fastener.

4. The process herein described of making shoes, which consists in providing an insole with an upstanding rib, attaching said insole to a last, pulling-over an upper relative to the last, and directly thereafter stapling the upper to the upstanding rib of the insole and simultaneously with said stapling operation side lasting the upper by pulling the free edge of said upper at two points over the last and the insole, the points of application of the strain being on the margin of the upper wholly above the insole and located at opposite sides of the staple fastener and the direction of the pull being inwardly from the edge of the insole.

5. That improvement in methods of making shoes which comprises stretching two laterally adjacent portions of an upper inwardly over the top of the channel rib of a welt shoe insole and inserting a staple substantially parallel with the tread face of the insole to fasten the portion of upper located between said portions, and repeating the operation on successive portions of the shoe to side last and fasten the shoe progressively.

6. That improvement in methods of making shoes which comprises tensioning the upper inwardly over the top of the upstanding channel rib of a welt shoe insole at two laterally adjacent points and pressing into lasted relation to the upstanding outer face of the rib and then fastening thereto the portion of upper between said points by inserting a staple through the upper and lip substantially perpendicular to said face of the rib, and repeating the operation on successive portions of the shoe to side last and fasten the shoe progressively.

7. That improvement in methods of making welt shoes which comprises tensioning an upper inwardly over the top face of the rib of an insole at two laterally adjacent points at a time, forcing the portion of upper between said two points into the angle of union between the rib and feather of the insole and uniting it to said rib by inserting through the upper and said rib an individual permanent fastening that will not interfere with the operation of the welter needle or with the inseam trimming operation, and repeating the operation on successive portions of the shoe to last and fasten the shoe progressively.

8. That improvement in methods of making welt shoes which comprises pulling an upper over the top face of the channel rib of the insole at two laterally adjacent points while pressing the upper and the outer face of the channel rib of the insole into close contact with each other between said two points, permanently uniting the upper and rib while pressed in such close contact with each other by inserting therethrough and clenching a staple of fine wire, and then uniting a welt to the upper and insole with stitches.

9. That improvement in methods of making shoes which comprises working successive portions of an upper over a last and securing the upper by repeated operations each of which repeated operations consists in tensioning the upper inwardly across the channel rib of the insole at two laterally adjacent points simultaneously and inserting a fastening between said points through the upper and the rib of the insole in a direction transverse to the rib.

10. That improvement in methods of making welt shoes which comprises pulling a portion of the upper over the top of an upstanding channel rib of an insole on a last, pressing a laterally adjacent portion of the upper and the outer face of the upstanding channel rib of the insole into close contact with each other, permanently uniting the upper and rib while in this relation by inserting therethrough and clenching a staple of fine wire, repeating the operation to last and fasten successive portions of the shoe progressively, and thereafter uniting the insole rib, the upper and a welt with stitches.

11. That improvement in methods of making shoes which consists in engaging the free edge of an upper and wedging the upper and its lining between an anvil on the inner side and prongs projecting forwardly from the face of a throat plate on the outer side of the upper so that the upper is drawn around the last during the relative movement of the anvil and throat plate into position for insertion of a staple and, substantially simultaneously with the completion of said relative movement, inserting a staple from the throat plate and clenching it against the anvil.

12. That improvement in methods of side lasting shoes which consists in engaging a shoe bottom in the inside channel of the insole and through the engaging means moving the shoe sidewise to bring the edge of the upper into drawing engagement with a lasting instrumentality shaped and arranged relatively to pull the edge of the upper inwardly across the outside channel rib or shoulder of the insole, and then fastening the upper to the outer face of the channel rib.

13. A method for use in the manufacture of shoes comprising pulling an upper by its free edge over a ribbed insole on a last by repeated operations, and as it is overworked driving through a laterally adjacent section of the upper and transversely through the rib of the insole a separate fastening and clenching the fastening.

In testimony whereof I have signed my name to this specification.

JOHN A. KELLY.